3,366,621
WATER-SOLUBLE REACTIVE DISAZO DYES

Jakob Benz, Oberwil, Basel-Land, and August Schweizer, Mutten, Basel-Land, Switzerland, assignors, by mesne assignments, to Fidelity Union Trust Company, executive trustee under Sandoz Trust of May 5, 1955
No Drawing. Continuation of application Ser. No. 515,177, Dec. 20, 1965. This application Feb. 28, 1967, Ser. No. 619,480
Claims priority, application Switzerland, Jan. 17, 1961, 523/61
6 Claims. (Cl. 260—146)

The present application is a continuation of application Ser. No. 515,177, filed Dec. 20, 1965, and now abandoned.

This invention relates to water-soluble reactive disazo dyes of the formula

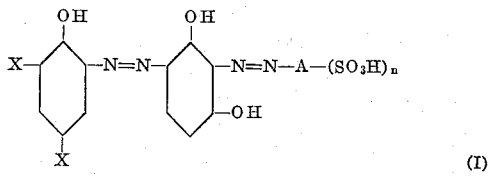

(I)

and their copper and nickel complex compounds, wherein one X represents a sulfonic acid group, the other X an —NH—R group where R stands for an organic radical, as hereinafter defined, permitting formation of chemical linkage with substrate, and A a radical of the benzene or naphthalene series which may contain further substituents, and $n$ one of the integers 2 or 3.

The process for the production of these dyes comprises coupling 1 mol of the diazo compound of an amine of the formula $$H_2N—A—(SO_3H)_n \qquad (II)$$

where A and $n$ have the afore-cited meanings, with 1 mol of a metallized or unmetallized monoazo dye of the formula

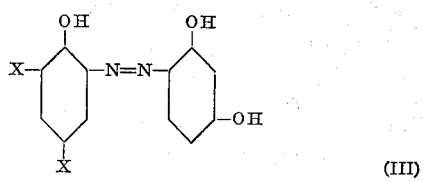

(III)

wherein the two X's have the aforenamed meanings, and converting the resulting disazo dye, if unmetallized, into the copper or nickel complex compound.

A modification of the process comprises coupling 1 mol of the diazo compound of an amine of the Formula II with 1 mol of the metallized or unmetallized monoazo dye of the formula

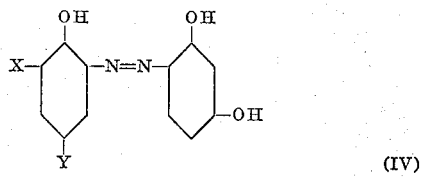

(IV)

wherein one Y represents a sulfonic acid group and the other Y a nitro or a hydrolyzable acylamino group, converting in the resulting disazo dye the nitro group, if present, by reduction or the saponifiable acylamino group, if present, by hydrolysis into the free amino group and reacting the resulting aminodisazo dye with a reactive component of the formula $$R—Hal \qquad (V)$$

wherein R has the above-named meaning and Hal represents chlorine or bromine, and converting the product, if necessary, into the copper or nickel complex compound before or after the reaction with R—Hal.

The substituents, which may be contained in the radical A apart from the sulfonic acid groups are e.g. halogen atoms (chlorine and bromine), low molecular alkyl or alkoxy groups (methyl, methoxy, ethoxy). The following amines of Formula II are preferably used:

1-aminobenzene-2,4-disulfonic acid,
1-aminobenzene-2,5-disulfonic acid,
1-aminobenzene-3,5-disulfonic acid,
1-amino-2-chlorobenzene-3,5-disulfonic acid,
1-amino-2-methylbenzene-3,5-disulfonic acid,
1-amino-2-methoxybenzene-3,5-disulfonic acid,
2-aminonaphthalene-1,5-disulfonic acid,
2-aminonaphthalene-4,8-disulfonic acid,
2-aminonaphthalene-5,7-disulfonic acid,
2-aminonaphthalene-6,8-disulfonic acid,
1-aminonaphthalene-3,7-disulfonic acid,
1-aminonaphthalene-4,6-disulfonic acid,
1-aminonaphthalene-4,7-disulfonic acid,
2-aminonaphthalene-1,5,7-trisulfonic acid,
2-aminonaphthalene-3,5,7-trisulfonic acid,
2-aminonaphthalene-4,6,8-trisulfonic acid,
1-aminonaphthalene-3,6,8-trisulfonic acid,
1-aminonaphthalene-4,6,8-trisulfonic acid.

The coupling of the diazo compounds of the amines of Formula II with the coupling components of the Formulae III or IV is carried out in weakly acid, neutral to alkaline medium at low temperatures, preferably between 0° and 20° C.

The monoazo dyes of Formulae III and IV are produced by coupling the diazo compounds of amines of the formulae

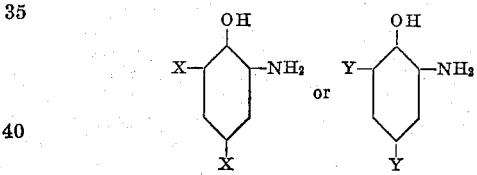

wherein X and Y possess the aforestated meanings, with 1,3-dihydroxybenzene in an acid, neutral or preferably alkaline medium at low temperatures, e.g. 0–20° C.

When in Formula IV one Y represents a nitro group, this group is reduced after the formation of the disazo dye, e.g. by treatment with an aqueous solution of sodium sulfide or sodium hydrogen sulfide, preferably at temperatures of 40° to 70° C. If the disazo dye employed contains copper or nickel atoms in complex combination, these metals are separated as insoluble sulfides during reduction so that the aminodisazo dye must be metallized again before or after the introduction of the reactive group.

When in Formula IV one Y represents an acylamino group, this group is hydrolyzed in the disazo dye at 70–100°, e.g. by heating in an aqueous solution of an alkali metal hydroxide, preferably in a 5–10% sodium or potassium hydroxide solution, at 70–100° C. or in a dilute mineral acid, preferably 5–10% hydrochloric or sulfuric acid, at 70–100° C. In the case of acid hydrolysis, demetallization takes place when the dye used is a metal-containing disazo dye, while in the case of alkaline hydrolysis no demetallizing occurs.

The radial R contains at least one substituent which can be split off as an anion and/or a multiple linkage capable of addition; it is preferably the radical remaining after cleavage of —OH, of an aliphatic saturated halogenated carboxylic acid or of an aliphatic unsaturated halogenated or unhalogenated carboxylic acid such as chloroacetic, bromoacetic, β-chloro- or β-bromopropionic, acrylic, methacrylic, α-chloro- or α-bromo-acrylic, β- or γ-chloro- or -bromo-crotonic, α,β- or β,β-dichloro- or -dibromo-acrylic acid; or the radical remaining after cleavage of a chlorine or bromine atom, of a halogenated heterocyclic compound, e.g. of a di- or trihalogeno-triazine such as cyanuric chloride, cyanuric bromide, primary condensation products of a cyanuric halide of the formula

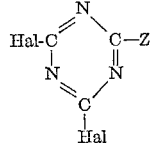

wherein Hal represents chlorine or bromine, and Z the radical, which may be further substituted, of a primary or secondary aliphatic, alicyclic, aromatic or heterocyclic amine, an aliphatic alicyclic, aromatic or heteroylic hydroxy or thio compound, in particular the radical of aniline, its alkyl and sulfonic acid or carboxylic acid derivatives, of low molecular mono- and di-alkylamines, and the radical of ammonia itself.

The introduction of the acid radicals is effected most easily by using the corresponding acid halides. It is advisable to work at low temperatures, e.g. 0–20° C., and in presence of acid-binding agents such as binding agents such as sodium carbonate, sodium hydroxide, calcium hydroxide or sodium acetate at a weakly acid, neutral or weakly alkaline reaction, for example in the pH region 4 to 9. For acylation, the carboxylic acid chlorides are used as such or in solution in two to five times the amount of benzene, chlorobenzene, methylbenzene, dimethylbenzene or acetone, and added dropwise to the aqueous, well buffered solution of the compound containing the amino group at e.g. 2–5° C. The introduction of a dihalogenocyanuric radical is best carried out in aqueous medium at about 0 °C. and at a weakly acid reaction, e.g. at pH values between 3 and 5. The cyanuric halide is used as such in solid form or in solution in an organic solvent, e.g. acetone. For the primary condensation products of a cyanuric halide it is best to choose a temperature of 30° to 60° C. and a pH value of 4 to 6.

The reaction is conducted so that only one halogen atom reacts with an exchangeable hydrogen atom of the amino group.

The reaction may be carried out in weakly alkaline, neutral to weakly acid medium but preferably within the pH region of 9 to 3. To neutralize the halogen halide formed, an acid-binding agent is added to the reaction solution at the start of the reaction or, alternatively, small portions of sodium or potassium carbonate or bicarbonate in solid pulverized form or as a concentrated aqueous solution are added in the course of the reaction. Aqueous solutions of sodium or potassium hydroxide are also suitable as neutralizing agents. The addition of small amounts of a wetting of emulsifying agent to the reaction mixture can accelerate the rate of reaction.

The conversion of the monoazo compounds or disazo dyes containing the reactive group into their copper or nickel complex compounds is carried out preferably in weakly acid aqueous solution. It is advantageous to allow an amount of a metal-yielding agent containing one atom of metal to act upon one molecule of monoazo compound or disazo dye. If the monoazo compounds or disazo dyes contain an acylamino group in place of the reactive group, the metallization can be carried out in alkaline medium in the presence of ammonia or amines.

Suitable copper compounds are e.g. cupric sulfate, cupric formate, cupric acetate and cupric chloride. Suitable nickel compounds are e.g. nickel formate, nickel acetate and nickel sulfate.

The metal complex compounds obtained are precipitated from their aqueous solution by the addition of salt, then filtered off, washed if necessary, and dried.

The metal-containing azo dyes obtained are homogeneous metal complex compounds in which essentially one atom of metal is combined with one molecule of the disazo compound.

They possess good solubility in water, good stability in printing pastes and padding liquors, good compatibility to salts and hard water, good reactivity with vegetable fibers, animal and synthetic polyamide fibers; they are insensitive to heavy metals such as copper, iron and chromium and reserve acetate, triacetate, polyester, polyacrylonitrile, polyvinyl chloride, polyvinyl acetate and polyalkylene fibers. Owing to their very slight substantivity the unfixed dye portion can easily be removed from the dyeings and prints on cellulosic fibers.

The new reactive dyes and their copper or nickel complex compounds are well suitable for the dyeing of leather and the dyeing, padding, and printing of wool, silk, synthetic polyamide fibers, and fibers of natural or regenerated cellulose on which they give full bloomy brown shades.

The addition of certain quaternizable amines such as trimethylamine, triethylenediamine, asymmetric dimethylhydrazine, preferably in stoichiometric amounts, accelerates the fixation of the dye on the fiber, so that the fixation temperature can be lowered and/or the fixation time shortened.

The dyeings and prints are aftertreated in an alkaline medium at a higher temperature if necessary and are then soaped. If produced with the metal free dyes, they are then coppered, on which they possess good fastness to light, washing, water, sea water, potting, milling, perspiration, rubbing, alkali, acids, vulcanizing, chlorine, bleaching (peroxides), gas fumes and dry cleaning (organic solvents). In addition they are stable to resin finishing and to acid and alkaline hydrolytic influences. In the following examples the parts and percentages are by weight and the temperatures in degrees centigrade.

*Example 1*

28 parts of 1-aminobenzene-2,5-disulfonic acid are dissolved in 300 parts of water and diazotized by the addition of 15 parts of 30% hydrochloric acid and a concentrated aqueous solution of 7.7 parts of sodium nitrite at 10°. The solution of the diazo compound is run into an ice-cooled alkaline solution of 37 parts of the monoazo dye 3 - acetylamino - 2,2',4'-trihydroxy-1,1'-azobenzene-5-sulfonic acid in 500 parts of water and 30 parts of sodium carbonate. On the completion of coupling the solution is neutralized and heated to 80°, and the disazo dye formed is precipitated by the addition of sodium chloride, filtered off, and washed with sodium chloride solution.

28 parts of 1-aminobenzene-2,5-disulfonic acid are added to 300 parts of water and diazotized at 10° by the addition of 15 parts of 30% hydrochloric acid and a concentrated aqueous solution of 7.7 parts of sodium nitrite. The resulting diazo compound is run into an ice-cooled solution of 37 parts of the monoazo dye 3-acetylamino-2,2',4'-trihydroxy-1,1'-azobenzene-5-sulfonic acid in 500 parts of water and 30 parts of sodium carbonate. On completion of coupling the resulting disazo dye is precipitated at 50° by the addition of sodium chloride, filtered off and washed with sodium chloride solution.

The paste is dissolved in 600 parts of 5% hydrochloric acid and the solution heated to 80°. In the course of 3–4 hours cleavage of the acetyl group takes place. The amino-disazo dye is precipitated by the addition of sodium chloride, filtered off and washed with dilute sodium chloride solution.

The paste is dissolved in 400 parts of water at 70° and the solution adjusted to a pH value of 5 with dilute sodium carbonate solution. An aqueous solution of 20 parts of crystallized copper sulfate is run in, the pH value being maintained between 4 and 6 by simultaneous addition of sodium carbonate solution. On completion of metallization the dye is precipitated by the addition of sodium chloride, in the form of its moist paste in 1200 parts of water at room temperature. The solution is run with thorough stirring into an ice-cooled suspension of 16 parts of finely powdered cyanuric chloride in 200 parts of ice-water, the pH value of the suspension being maintained between 4 and 5 by the even addition of aqueous sodium carbonate solution. On completion of the reaction the reactive dye formed is precipitated by the addition of sodium chloride, filtered off, washed with dilute sodium chloride solution, and dried with vacuum at 30–40°. It is a black-brown powder which dissolved in water with a brown coloration. It is applied to cellulosic fibers from a soda-alkaline dyebath in presence of sodium sulfate at 25–35° to give dark brown shades fast to light and wet treatments.

*Example 2*

28 parts of 1-aminobenzene-2,5-disulfonic acid are dissolved in 300 parts of water and diazotized by the addition of 30 parts of 30% hydrochloric acid and a concentrated aqueous solution of 7.7 parts of sodium nitrite at 10°. The solution of the diazo compound is run into an ice-cooled alkaline solution of 67 parts of the copper complex compound of 3-(4″-phenylamino-6″-chloro-1″,3″,5″-triazinyl - 2″)-amino-2,2′,4′-trihydroxy-1,1′-azobenzene-3‴,5-disulfonic acid in 900 parts of water and 40 parts of sodium carbonate. On completion of coupling the solution is neutralized and heated to 80°, and the disazo dye formed is precipitated by the addition of sodium chloride, filtered off, and dried. It is a dark-brown powder which dissolves in water with a brown coloration and gives on cellulosic fibers full brown prints fast to light and wet treatments.

*Example 3*

28 parts of 1-aminobenzene-2,5-disulfonic acid are added to 300 parts of water and diazotized at 10° by the addition of 15 parts of 30% hydrochloric acid and a concentrated aqueous solution of 7.7 parts of sodium nitrite. The resulting diazo compound is run into an ice-cooled solution of 37 parts of the monoazo dye 3-acetylamino-2,2′,4′-trihydroxy-1,1′-azobenzene-5-sulfonic acid in 500 parts of water and 30 parts of sodium carbonate. On completion of coupling the resulting disazo dye is precipitated at 50° by the addition of sodium chloride, filtered off and washed with sodium chloride solution.

The dye paste is dissolved in 600 parts of 5% hydrochloric acid and the solution heated to 80°. In the course of 3–4 hours cleavage of the acetyl group takes place. The aminodisazo dye is precipitated by the addition of sodium chloride, filtered off and washed with dilute sodium chloride solution.

The dye paste is dissolved in 400 parts of water at 70° and the solution adjusted to a pH value of 5 with dilute sodium carbonate solution. An aqueous solution of 20 parts of crystallized copper sulfate is run in, the pH value being maintained between 4 and 6 by simultaneous addition of sodium carbonate solution. On completion of metallization the dye is precipitated by the addition of sodium chloride, filtered off and washed with dilute sodium chloride solution. It is then dissolved in the form of its moist paste in 1200 parts of water at room temperature.

12 parts of β-chloropropionyl chloride are run into the solution at an even rate with good stirring while at the same time the pH value of the solution is maintained at 6–7 by the addition of aqueous sodium carbonate solution. On completion of the reaction the reactive dye formed is precipitated from the warm solution by the addition of sodium chloride, filtered off, washed with dilute sodium chloride solution, and dried with vacuum at 80°. A black brown powder is obtained which dissolves in water with a brown coloration.

Further dyes coming within the scope of the present invention are listed in the following table. They are obtainable according to the particulars of Examples 1 to 3 and are characterized by the nature of the amines of Formula II, the coupling components, the reactive components, the metal used for complex formation, and the shade of the fixed dyeing on cotton.

TABLE

| Example No. | Amine of the formula (II) (I) | Monoazo dye used as coupling component (II) | R = Radical of— (III) | Metal (IV) | Shade of the fixed dyeing on cotton (V) |
|---|---|---|---|---|---|
| 4 | 1-amino-2-methylbenzene-3,5-disulfonic acid. | 3-R-amino-2.2′,4′-trihydroxy-1,1′-azobenzene-5-sulfonic acid. | 2-amino-4,6-dichloro-1,3,5-triazine. | Cu | Brown. |
| 5 | ----do---- | ----do---- | ----do---- | Ni | Do. |
| 6 | 1-aminobenzene-2,5-disulfonic acid | ----do---- | ----do---- | Cu | Do. |
| 7 | 2-aminoaphthalene-4,6,8-trisulfonic acid. | ----do---- | ----do---- | Cu | Do. |
| 8 | 2-aminonaphthalene-4,6,8-trisulfonic acid. | ----do---- | 2,4,6-trichloro-1,3,5-triazine. | Cu | Do. |
| 9 | 1-amniobenzene-2,5-disulfonic acid | ----do---- | ----do---- | Ni | Do. |
| 10 | 1-aminobenzene-2,4-disulfonic acid. | ----do---- | ----do---- | Cu | Do. |
| 11 | ----do---- | 3-R-amino-2,2′,2′-trihydroxy-1,1′-azobenzene-5-sulfonic acid. | ----do---- | Ni | Do. |
| 12 | ----do---- | ----do---- | ff-chloropropionyl chloride. | Cu | Do. |
| 13 | 1-aminobenzene 2,5-disulfonic acid | ----do---- | ----do---- | Ni | Do. |
| 14 | 2-aminonaphthalene-4,6,8-trisulfonic acid. | ----do---- | ----do---- | Cu | Do. |
| 15 | 2-aminonaphthalene-3,5,7-trisulfonic acid. | ----do---- | ----do---- | Cu | Do. |
| 16 | 1-aminonaphthalene-3,6,8-trisulfonic acid. | 3-R-amino-2, 2′, 4′-trihydroxy-1, 1′-azobenzene-5-sulfonic acid. | 2-phenylamino-4,6-dichloro-1,3,5-triazine-3′-sulfonic acid. | Cu | Do. |
| 17 | 2-aminonaphthalene-1,5,7-trisulfonic acid. | ----do---- | ----do---- | Cu | Do. |
| 18 | 1-aminonaphthalene-4,6,8-trisulfonic acid. | ----do---- | ----do---- | Cu | Do. |
| 19 | 1-aminobenzene-2,5-disulfonic acid | ----do---- | Chloracetyl chloride. | Cu | Do. |
| 20 | 2-aminonaphthalene-4,6,8-trisulfonic acid. | ----do---- | ----do---- | Cu | Do. |
| 21 | 1-aminonaphthalene-3,6,8-trisulfonic acid. | ----do---- | ----do---- | Cu | Do. |
| 22 | 1-aminobenzene-3,5-disulfonic acid | ----do---- | ----do---- | Cu | Do. |
| 23 | 1-aminobenzene-2,5-disulfonic acid | ----do---- | Bromacetyl chloride. | Cu | Do. |
| 24 | ----do---- | ----do---- | β-bromopropionyl chloride. | Cu | Do. |
| 25 | ----do---- | ----do---- | Acrylyl chloride. | Cu | Do. |
| 26 | ----do---- | ----do---- | Methacrylyl chloride. | Cu | Do. |
| 27 | ----do---- | ----do---- | 2,4,6-tribromo-1,3,5-triazine. | Cu | Do. |
| 28 | 2-aminonaphthalene-4,6,8-trisulfonic acid. | ----do---- | 2-phenylamino-4,6-dibromo-1,3,5-triazine-4′-sulfonic acid. | Cu | Do. |
| 29 | ----do---- | ----do---- | 2-(2′-hydroxy-ethylamino)-4,6-dichloro-1,3,5-triazine. | Cu | Do. |
| 30 | ----do---- | ----do---- | 2-diethylamino-4,6-dichloro-1,3,5-triazine. | Cu | Do. |
| 31 | ----do---- | ----do---- | 2-(2′-carboxyphenyl-amino)-4,6-dichloro-1,3,5-triazine. | Cu | Do. |

TABLE—Continued

| Example No. | Amine of the formula (II)  (I) | Monoazo dye used as coupling component  (II) | R = Radical of—  (III) | Metal  (IV) | Shade of the fixed dyeing on cotton  (V) |
|---|---|---|---|---|---|
| 32 | 2-aminonaphthalene-3,5,7-trisulfonic acid. | 5-R-amino-2,2',4'-trihydroxy-1,1'-azobenzene-3-sulfonic acid. | 2,4,6-trichloro-1,3,5-triazine. | Cu | Do. |
| 33 | 1-aminobenzene-2,5-disulfonic acid. | ___do___ | 2-amino-4,6-dichloro-1,3,7-triazine. | Ni | Do. |
| 34 | ___do___ | ___do___ | 2-phenylamino-4,6-dichloro-1,3,5-triazine-2'-sulfonic acid. | Cu | Do. |
| 35 | ___do___ | ___do___ | Chloracetyl chloride. | Cu | Do. |
| 36 | 1-aminonaphthalene-3,6,8-trisulfonic acid. | ___do___ | β-chloropropionyl chloride. | Cu | Do. |
| 37 | ___do___ | ___do___ | α,β-dibromopropionyl chloride. | Cu | Do. |
| 38 | 2-aminonaphthalene-3,6,8-trisulfonic acid. | ___do___ | 2-dimethylamino-4,6-dichloro-1,3,5-triazine. | Cu | Do. |
| 39 | ___do___ | ___do___ | α,β-dibromoacrylyl chloride. | Cu | Do. |
| 40 | ___do___ | ___do___ | 2-phenylamino-4,6-dichloro-1,3,5-triazine. | Cu | Do. |
| 41 | 2-aminonaphthalene-5,7-disulfonic acid. | ___do___ | 2-(2'-hydroxypropylamino)-4,6-dichloro-1,3,5-triazine. | Cu | Do. |
| 42 | 2-aminonaphthalene-4,8-disulfonic acid. | ___do___ | α-chloracrylyl chloride. | Ni | Do. |
| 43 | 1-aminobenzene-3,5-disulfonic acid. | 3-R-amino-2,2',4'-trihydroxy-1,1'-azobenzene-5-sulfonic acid. | 2-di-(2'-hydroxyethyl)-amino-4,6-dichloro-1,3,5-triazine. | Cu | Do. |
| 44 | 1-aminonaphthalene-3,6,8-trisulfonic acid. | ___do___ | 2-ethylamino-4,6-dichloro-1,3,6-triazine. | Cu | Do. |
| 45 | 2-aminonaphthalene-1,5,7-trisulfonic acid. | ___do___ | α,β-dichloracrylyl chloride. | Cu | Do. |
| 46 | 1-aminonaphthalene-4,6,8-trisulfonic acid. | ___do___ | γ-chlorocrotonyl chloride. | Cu | Do. |
| 47 | ___do___ | ___do___ | β-chloracrylyl chloride. | Ni | Do. |
| 48 | 1-aminobenzene-2,5-disulfonic acid. | ___do___ | Chloracetyl chloride. | Ni | Do. |
| 49 | 1-aminobenzene-2,4-disulfonic acid. | 5-R-amino-2,2',4'-trihydroxy-1,1'-azobenzene-5-sulfonic acid. | γ-bromocrotonyl chloride. | Cu | Do. |
| 50 | ___do___ | ___do___ | 2-(2'-ethoxyethylamino)-4,6-dichloro-1,3,5-triazine. | Cu | Do. |
| 51 | 2-aminonaphthalene-4,8-disulfonic acid. | ___do___ | 2-(2'-sulfoethylamino)-4,6-dichloro-1,3,5-triazine. | Cu | Do. |
| 52 | 1-amino-2-chlorobenzene-3,5-disulfonic acid. | ___do___ | ___do___ | Cu | Do. |
| 53 | ___do___ | 3-R-amino-2,2',4'-trihydroxy-1,1'-azobenzene-5-sulfonic acid. | α,β-dichloropropionyl chloride. | Cu | Do. |
| 54 | 1-amino-2-methoxybenzene-3,5-disulfonic acid. | ___do___ | Chloracetyl chloride. | Cu | Do. |
| 55 | 1-aminobenzene-2,5-disulfonic acid. | ___do___ | β-chlorocrotonyl chloride. | Cu | Do. |
| 56 | ___do___ | ___do___ | β,β-dibromacrylyl chloride. | Cu | Do. |
| 57 | ___do___ | ___do___ | 2-(4'-carboxyphenylamino)-4,6-dichloro-1,3,5-triazine. | Cu | Do. |
| 58 | 2-aminonaphthalene-3,5,7-trisulfonic acid. | 3-R-amino-3,3',4'-trihydroxy-1,1'-azobenzene-5-sulfonic acid. | 2-methylamino-4,6-dichloro-1,3,5-triazine. | Cu | Do. |
| 59 | ___do___ | ___do___ | β,β-dichloracrylyl chloride. | Cu | Do. |
| 60 | ___do___ | ___do___ | β-bromocrotonyl chloride. | Cu | Do. |
| 61 | ___do___ | ___do___ | 2-(3'-methoxypropylamino)-4,6-dichloro-1,3,5-triazine. | Cu | Do. |
| 62 | ___do___ | ___do___ | 2-carboxymethylamino-4,6-dichloro-1,3,5-triazine. | Cu | Do. |
| 63 | ___do___ | ___do___ | 2-(2'carboxyethylamino)-4,6-dichloro-1,3,5-triazine. | Cu | Do. |
| 64 | 1-aminonaphthalene-4,6-disulfonic acid. | ___do___ | 2-N-methyl-N-2'-sulfoethylamino-4,6-dichloro-1,3,5-triazine. | Ni | Do. |
| 65 | 2-aminonaphthalene-6,8-disulfonic acid. | ___do___ | ___do___ | Cu | Do. |
| 66 | ___do___ | ___do___ | 2-di-(3'-hydroxypropyl)-amino-4,6-dichloro-1,3,5-triazine. | Cu | Do. |
| 67 | ___do___ | 3-R-amino-2,2',4'-trihydroxy-1,1'-azobenzene-5-sulfonic acid. | 2-N-methyl-N-carboxymethyl-amino-4,6-dichloro-1,3-5-triazine. | Cu | Do. |
| 68 | 2-aminonaphthalene-4,6,8-trisulfonic acid. | 5-R-amino-2,2',4'-trihydroxy-1,1'-azobenzene-3-sulfonic acid. | 2-ethylamino-4,6-dichloro-1,3,5-triazine. | Cu | Do. |
| 69 | ___do___ | ___do___ | 2-amino-4,6-dibromo-1,3,5-triazine. | Cu | Do. |
| 70 | ___do___ | ___do___ | 2-phenylamino-4,6-dibromo-1,3,5-triazine-3'-sulfonic acid. | Ni | Do. |
| 71 | ___do___ | 3-R-amino-2,2',4'-trihydroxy-1,1'-azobenzene-5-sulfonic acid. | 2-(4'-methoxybutylamino)-4,6-dichloro-1,3,5-triazine. | Cu | Do. |

Formulae of representative dyes of the foregoing examples are as follows:

Example 1:

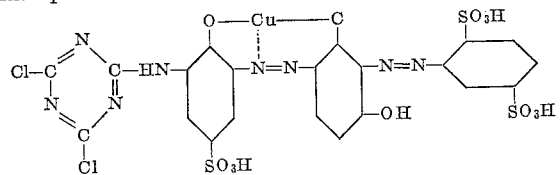

Example 2:

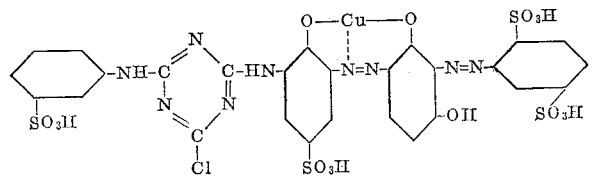

Example 3:

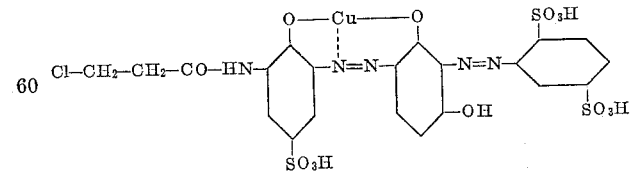

Example 19:

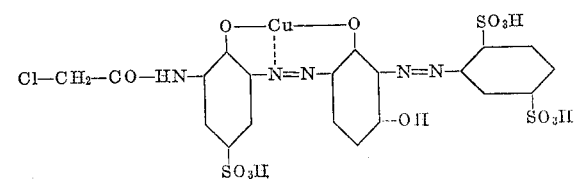

What is claimed is:
1. A member selected from the group consisting of a water soluble reactive disazo dye of the formula

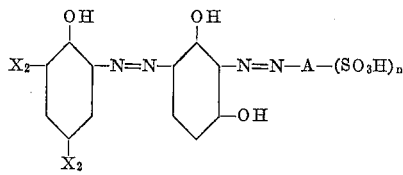

and its copper and nickel complex compounds, wherein:
A is a member selected from the group consisting of phenyl, halogenphenyl, lower alkylphenyl, lower alkoxyphenyl and naphthyl, halogen being selected from the group consisting of Cl or Br, $n$ is one of the integers 2 and 3, one $X_2$ is a sulfonic acid group, and the other $X_2$ is a member selected from the group consisting of 4,6-dihalogeno-1,3,5-triazinyl-2-amino, 4-amino-6-halogeno-1,3,5-triazinyl-2-amino, 4-lower alkylamino-6-halogeno-1,3,5-triazinyl-2-amino, 2-di(lower)alkylamino - 6 - halogeno-1,3,5-triazinyl-2-amino, 4-hydroxy (lower)alkylamino-6-halogeno-1,3,5-triazinyl-2-amino, 4-di[hydroxy(lower)alkyl]amino-6-halogeno-1,3,5-triazinyl-2-amino, 4-phenylamino-6-halogeno-1,3,5-triazinyl-2-amino, 4-carboxyphenylamino-6-halogeno-1,3,5-triazinyl-2-amino, 4-carboxy(lower)alkylamino-6-halogeno - 1,3,5 - triazinyl-2-amino, 4-(lower)alkoxy(lower)alkylamino-6-halogeno-1,3,5-triazinyl-2-amino, and 4-sulfo(lower)alkylamino - 6 - halogeno-1,3,5-triazinyl-2-amino, halogen being selected from the group consisting of Cl and Br.

2. A member selected from the group consisting of a water-soluble reactive disazo dye of the formula

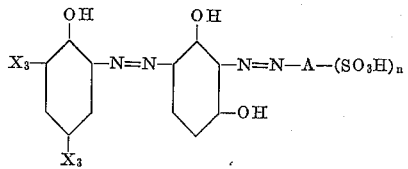

and its copper and nickel complex compounds, wherein:
A is a member selected from the group consisting of phenyl, halogenphenyl, lower alkylphenyl, lower alkoxyphenyl and naphthyl, halogen being selected from the group consisting of Cl and Br, $n$ is one of the integers 2 and 3, one $X_3$ is a sulfonic acid group, and the second $X_3$ represents acylamino selected from the group consisting of halogenoacetylamino, $\beta$-halogenopropionylamino, $\alpha,\beta$-dihalogenopropionylamino, acrylylamino, methacrylylamino, $\alpha$-halogenoacrylylamino, $\alpha,\beta$-dihalogenoacrylylamino, $\gamma$-halogenocrotonylamino, $\beta$ - halogenocrotonylamino, and $\beta,\beta$-dihalogenoacrylylamino, halogen being selected from the group consisting of Cl and Br.

3. A water-soluble reactive dye, said dye being of the formula

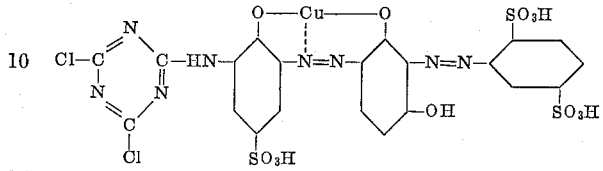

4. A water-soluble reactive dye, said dye being of the formula

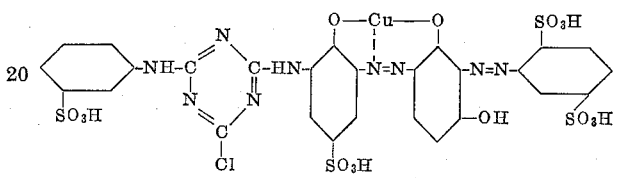

5. A water-soluble reactive dye, said dye being of the formula

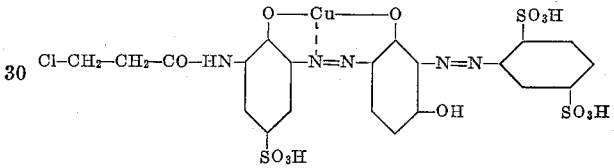

6. A water-soluble reactive dye, said dye being of the formula

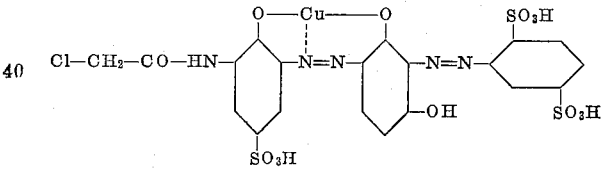

References Cited

UNITED STATES PATENTS

| | | | |
|---|---|---|---|
| 3,125,562 | 3/1964 | Ammann et al. | 260—146 |
| 3,134,760 | 5/1964 | Schweizer et al. | 260—146 |
| 3,227,704 | 1/1966 | Schweizer et al. | 260—146 |

CHARLES B. PARKER, *Primary Examiner.*

F. D. HIGEL, *Assistant Examiner.*